United States Patent
Emeott et al.

(10) Patent No.: US 11,256,923 B2
(45) Date of Patent: Feb. 22, 2022

(54) DETECTING SENTINEL FRAMES IN VIDEO DELIVERY USING A PATTERN ANALYSIS

(71) Applicant: ARRIS Enterprises LLC, Suwanee, GA (US)

(72) Inventors: Stephen P. Emeott, Rolling Meadows, IL (US); Renxiang Li, Lake Zurich, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/153,236

(22) Filed: May 12, 2016

(65) Prior Publication Data
US 2017/0330041 A1    Nov. 16, 2017

(51) Int. Cl.
*G06K 9/00* (2006.01)
*G06K 9/62* (2006.01)

(52) U.S. Cl.
CPC ..... *G06K 9/00758* (2013.01); *G06K 9/00744* (2013.01); *G06K 9/6201* (2013.01); *G06K 9/00765* (2013.01)

(58) Field of Classification Search
None
See application file for complete search history.

(56) References Cited

U.S. PATENT DOCUMENTS

| | | | |
|---|---|---|---|
| 5,635,982 A * | 6/1997 | Zhang | G06K 9/00711 348/231.99 |
| 6,100,941 A * | 8/2000 | Dimitrova | G11B 27/107 348/700 |
| 6,363,380 B1 * | 3/2002 | Dimitrova | G06K 9/00711 707/740 |
| 7,164,798 B2 | 1/2007 | Hua et al. | |
| 7,684,616 B2 | 3/2010 | Cieplinski | |
| 7,761,491 B2 | 7/2010 | Glasberg et al. | |
| 8,654,255 B2 | 2/2014 | Hua et al. | |

(Continued)

OTHER PUBLICATIONS

Zhuang, Yueting, et al. "Adaptive key frame extraction using unsupervised clustering." Image Processing, 1998. ICIP 98. Proceedings. 1998 International Conference on. vol. 1. IEEE, 1998.*

(Continued)

*Primary Examiner* — Michelle M Entezari
(74) *Attorney, Agent, or Firm* — Buchanan, Ingersoll & Rooney, PC (57) ABSTRACT

Particular embodiments extract features for frames from a video. Then, a sequence of frames is identified based on a pattern analysis of frames based on the features. This pattern may be used to select sentinel features from the sequence of frames. For example, a pattern may include a first sentinel sequence followed by a transitional frame and then a second sentinel sequence. The transitional frame may be a black frame that is used to identify back-to-back sentinel sequences. Then, a sentinel frame that demarks a transition from a first content type to a second content type is identified. For example, the frames on either side of the black frame may be very similar and be identified as sentinel frames that mark a transition from program content to advertisement content. The above process may allow automated detection of sentinel frames that can run without user supervision.

14 Claims, 8 Drawing Sheets

(56) References Cited

U.S. PATENT DOCUMENTS

| | | | | |
|---|---|---|---|---|
| 9,501,498 | B2* | 11/2016 | Wnuk | G06F 16/5866 |
| 2003/0117428 | A1* | 6/2003 | Li | G06F 16/785 |
| | | | | 715/716 |
| 2004/0170321 | A1 | 9/2004 | Gong et al. | |
| 2004/0194130 | A1 | 9/2004 | Konig et al. | |
| 2005/0228849 | A1* | 10/2005 | Zhang | G06F 17/30787 |
| | | | | 709/200 |
| 2008/0232687 | A1* | 9/2008 | Petersohn | G06F 16/786 |
| | | | | 382/173 |
| 2008/0316307 | A1* | 12/2008 | Petersohn | G06K 9/00765 |
| | | | | 348/135 |
| 2009/0066838 | A1* | 3/2009 | Kasutani | G06F 17/30802 |
| | | | | 348/564 |
| 2009/0123025 | A1* | 5/2009 | Deng | G06K 9/3266 |
| | | | | 382/100 |
| 2009/0282454 | A1* | 11/2009 | Ekstrand | H04N 21/44008 |
| | | | | 725/134 |
| 2010/0039564 | A1* | 2/2010 | Cui | G10L 15/26 |
| | | | | 348/700 |
| 2010/0092077 | A1 | 4/2010 | Peters et al. | |
| 2010/0278434 | A1* | 11/2010 | Uchida | G06K 9/00744 |
| | | | | 382/199 |
| 2011/0013882 | A1* | 1/2011 | Kusunoki | G11B 27/28 |
| | | | | 386/241 |
| 2011/0064318 | A1* | 3/2011 | Gao | G06F 17/30781 |
| | | | | 382/224 |
| 2012/0263388 | A1 | 10/2012 | Vaddadi et al. | |
| 2013/0198783 | A1* | 8/2013 | Chen | G06K 9/4604 |
| | | | | 725/53 |
| 2013/0259323 | A1* | 10/2013 | Deng | G06K 9/00261 |
| | | | | 382/118 |
| 2014/0086557 | A1* | 3/2014 | Yu | H04N 21/4325 |
| | | | | 386/241 |
| 2014/0104494 | A1* | 4/2014 | Begeja | H04N 5/45 |
| | | | | 348/564 |
| 2014/0196085 | A1* | 7/2014 | Dunker | H04N 21/23424 |
| | | | | 725/36 |
| 2014/0237261 | A1* | 8/2014 | Diep | G06F 12/1408 |
| | | | | 713/189 |
| 2016/0037232 | A1 | 2/2016 | Hu et al. | |
| 2016/0078297 | A1* | 3/2016 | Wang | G11B 27/3081 |
| | | | | 386/241 |
| 2016/0337691 | A1* | 11/2016 | Prasad | H04N 21/4394 |
| 2018/0060550 | A1* | 3/2018 | Li | G06T 19/00 |

OTHER PUBLICATIONS

Sevcik L, Voznak M. Adaptive Reservation of Network Resources According to Video Classification Scenes. Sensors. Jan. 2021;21(6):1949. (Year: 2021).*

Raptis M, Sigal L. Poselet key-framing: A model for human activity recognition. InProceedings of the IEEE Conference on Computer Vision and Pattern Recognition 2013 (pp. 2650-2657). (Year: 2013).*

U.S. Appl. No. 15/153,370, filed May 12, 2016. Richard Li et al., "Generating Synthetic Frame Features for Sentinel Frame Matching", (Pending publication, filed on even date with present application.).

PCT Search Report & Written Opinion, RE: Application No. PCT/US2015/032117, dated Aug. 1, 2017.

Office Action (Examination Report under section 18(3)) dated May 4, 2021, by the Intellectual Property Office in corresponding United Kingdom Patent Application No. 1818377.2 (2 pages).

* cited by examiner

DETECTING SENTINEL FRAMES IN VIDEO DELIVERY USING A PATTERN ANALYSIS

BACKGROUND

Sentinel sequences may identify transitions between a first type of content and a second type of content. These sequences may also be referred to as "bumper" sequences. Sentinel sequences may be short clips or animations that typically last a short period of time, such as 2-5 seconds, and can be replayed several times in the same video. Also, similar sentinel sequences may be displayed in other videos over a time period, such as over the course of a day or longer.

The sentinel sequences may be identified using one or more key frames that are manually extracted from the recorded content. For example, a user may manually view the content and identify the sentinel sequences. Then, the user needs to manually extract a frame from the sentinel sequence. This may help an ad detection system to replace the ads. However, this is a highly manual process, and it is hard to train a user to extract the correct sentinel frame.

DETAILED DESCRIPTION

Described herein are techniques for a content detection system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments extract features for frames from a video. Then, a sequence of frames is identified based on a pattern analysis of frames based on the features. This pattern may be used to select sentinel features from the sequence of frames. For example, a pattern may include a first sentinel sequence followed by a transitional frame and then a second sentinel sequence. The transitional frame may be a black frame that is used to identify back-to-back sentinel sequences. Then, a sentinel frame that demarks a transition from a first content type to a second content type is identified. For example, the frames on either side of the black frame may be very similar and be identified as sentinel frames that mark a transition from program content to advertisement content. The above process may allow automated detection of sentinel frames that can run without user supervision.

Overview

Figure 1:
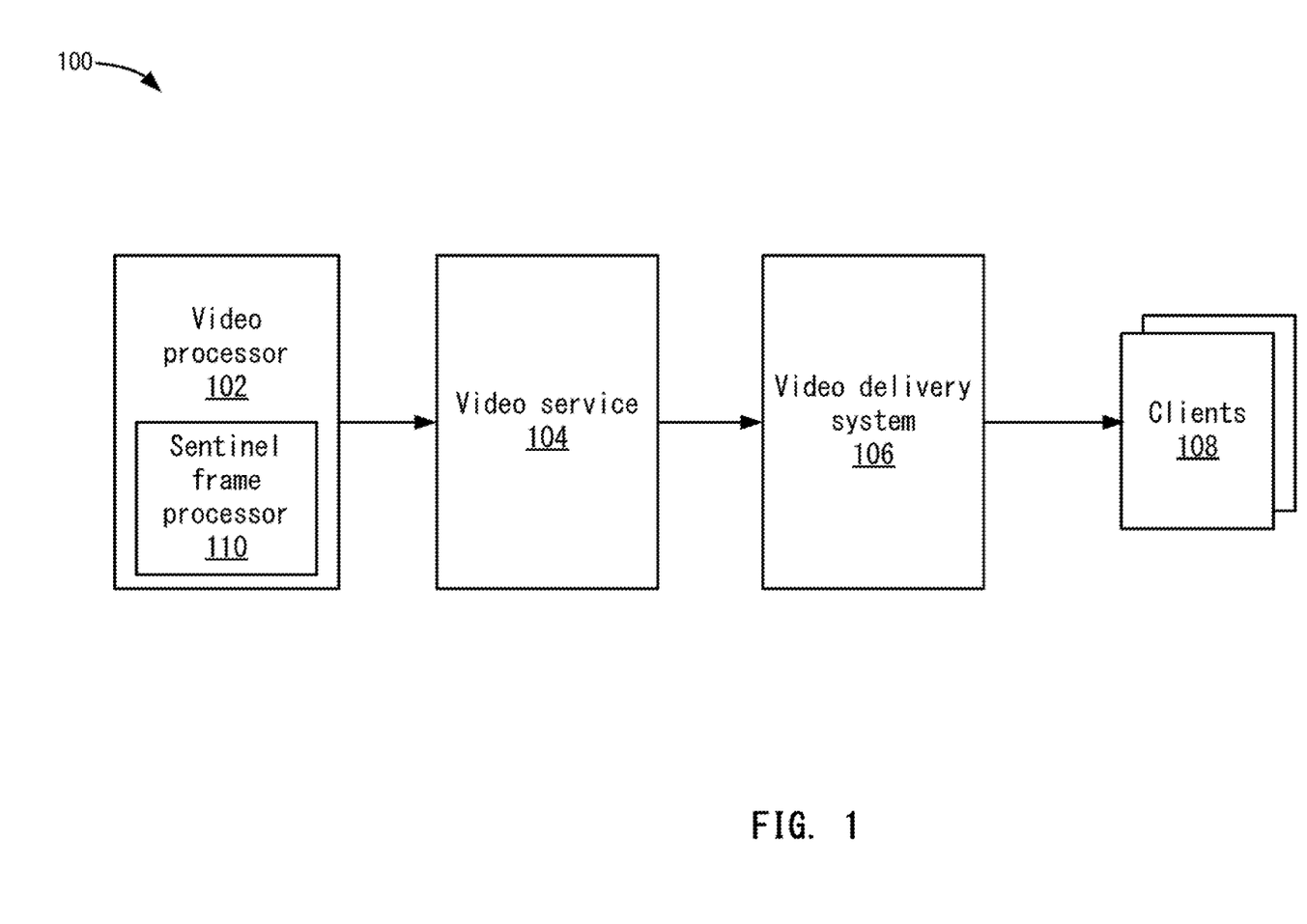
FIG. 1 depicts a simplified system for identifying sentinel frames according to one embodiment.

FIG. 1 depicts a simplified system 100 for identifying sentinel frames according to one embodiment. System 100 includes a video processor 102, a video service 104, a video delivery system 106, and clients 108. Video processor 102 may receive a video and/or multiple videos from video content providers. Video processor 102 may be part of a video service provider that may deliver the videos to clients 108. For example, clients 108 may include customer premise equipment (CPE), such as set top boxes, mobile devices, or other computing devices, that receive the videos, such as through a broadcast or on-demand in a cable network.

Video processor 102 includes a sentinel frame processor 110 that can analyze the video to determine sentinel frames. The sentinel frames are identified without prior knowledge of the content of the sentinel frames. The sentinel frames signal a transition or boundary between a first type of content and a second type of content. For example, the sentinel frames may be key frames or images that may be repeatedly used to identify ad boundaries. This may be where program content transitions to advertisement content, different types of ads are shown, or a segment in a show transitions to a new segment. As will be discussed in more detail below, a pattern for frames of the video may be used to identify sentinel frames.

Video processor 102 generates visual features for the sentinel frames. Although visual features may be used for discussion purposes, other features may be used, such as audio, textual, and/or different combinations of audio, visual, and textual. This allows video service 104 to search videos to identify where sentinel frames appear in the videos. Video service 104 may then perform services on the video program using the locations of the sentinel frames.

Once the position of sentinel frames in the video are identified, video service 104 may perform a service, such as replacing the video segments with different video content. For example, video service 104 may replace advertisements from one locality for advertisements that are more pertinent to a second locality. Although video replacement is described, other services may be performed, such as translation and video editing.

Video service 104 then passes the video with the replaced content to video delivery system 106. Video delivery system 106 may then be used to deliver the video program with the replaced video content to clients 108. In one embodiment, video delivery system 106 may have the video content replaced in substantially real time. For example, the sentinel frames may be detected and video content replaced by video service 104 with only a one or two second delay in delivering video content from a broadcast (e.g., a live or scheduled broadcast). In other embodiments, video delivery system 106 may have the video replaced in the video content in the background or before the initiation of delivery of the video program. In other embodiments, the video delivery system 106 may extract a video program from a live video stream based upon sentinel frames located at the beginning and the end of the program.

Example Pattern to Identify Sentinel Frames

Figure 2:
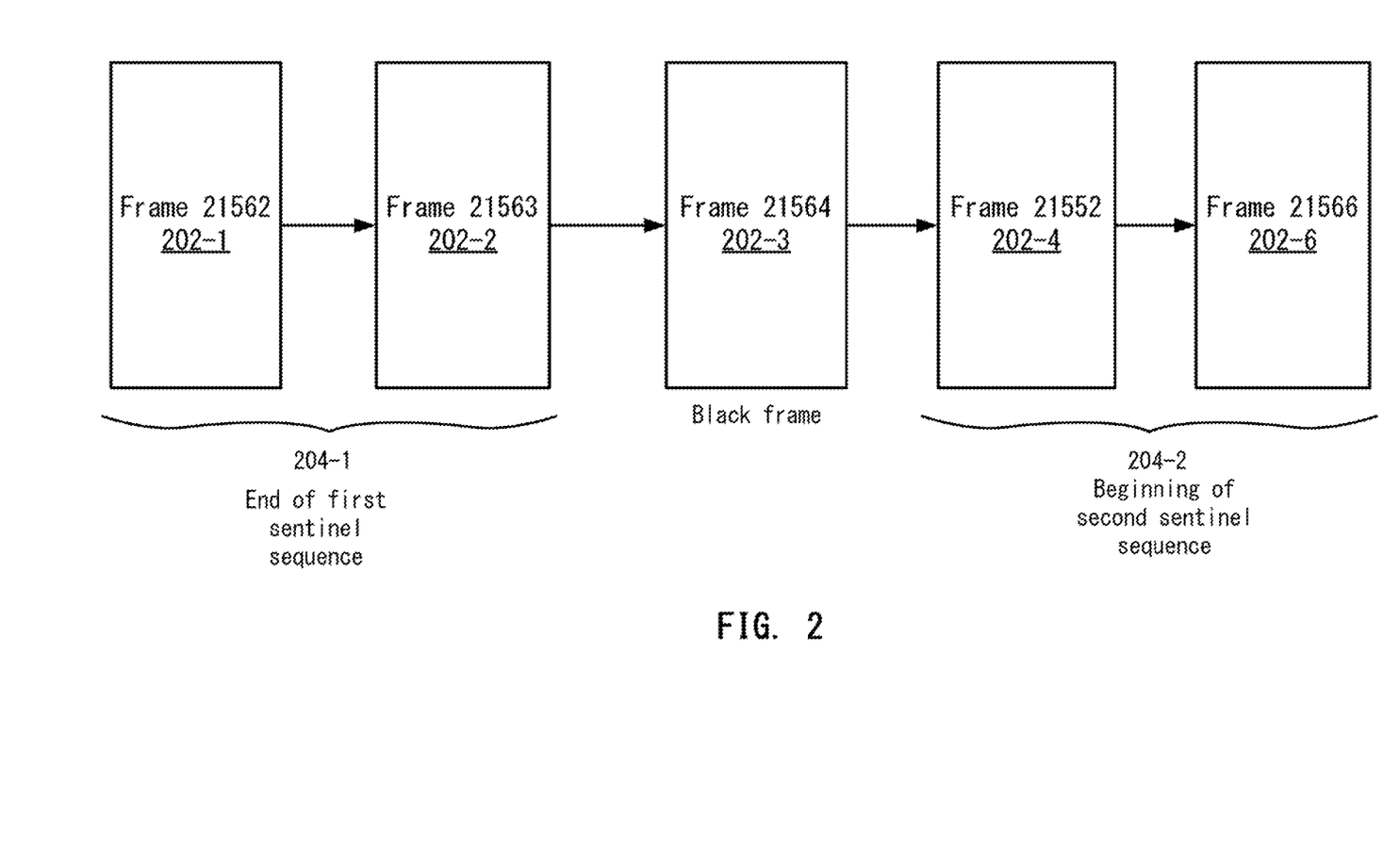
FIG. 2 depicts an example of a pattern that could be used to determine sentinel frames according to one embodiment.

As mentioned above, sentinel frame processor 110 may use patterns to detect sentinel frames. FIG. 2 depicts an example of a pattern that could be used to determine sentinel frames according to one embodiment. In one embodiment, the pattern is on the frame level. For example, the pattern is based on frame-level sequences between the frames and not based on content within a single frame or a within portion of a single frame. For example, the pattern may be a sequence of sentinel frames followed by a transition frame and then a sequence of sentinel frames again. The sentinel frame is not detected based on a logo or something else found within a single sentinel frame.

A video includes a series of frames 202-1-202-5 labeled in sequence from frames 21562-21566 of the video. There are other frames that appear before and after this sequence in the video (not shown). At 204-1, a first sentinel frame sequence is shown and at 204-2, a second sentinel frame sequence is shown. The sentinel frame sequence shown at 204-1 may be the end of a first sentinel frame sequence and the sentinel frame sequence shown at 204-2 may be the start of a second sentinel frame sequence. The first and second sentinel sequences may be the same sequence or different sequences. However, the first and second sentinel sequences include at least one frame that is similar.

A transition frame 202-3, such as a black frame, may be different from the sentinel frame sequences. This transition frame may be used to signal a transition from the first sentinel frame sequence to the second sentinel frame sequence. Examples of sentinel transitional frames may include black frames, animated sequences, other solid color frames, or other information that may be inserted between multiple sentinel frame sequences. These transitional frames may be associated between two sentinel sequences. In this case, the pattern may be back-to-back sentinel frame sequences in a video that includes a transition frame between the back-to-back sentinel frame sequences. The back-to-back sentinel frame sequences may be during a transition from sponsor ads to product ads, or from program content to advertising content. The one or more transition frames, such as black frames, may be in between the sentinel frame sequence and may be identified. For example, black frames may be easily identified based on visual features of the frame such as, a color layout descriptor (CLD) or edge histogram (EHD) may be used to detect black frames.

When back-to-back sentinel frame sequences are used, the frames on either side of the transition frame may be very similar. For example, frame 202-2 is similar to frame 202-4. This pattern may be used to identify sentinel frames. Although this pattern is discussed, it will be understood that other patterns may also be used. For example, a one-sided sentinel frame sequence may occur when a video program transitions from program to advertisements and back again. The one-sided pattern occurs when video content on a first side of the black frame is a sentinel frame sequence and the video content on the second side is not a sentinel frame sequence. Rather, the video on the second side may be an advertisement. This pattern is detectable because the sentinel frame sequence forms a pattern that will be repeated at many program breaks whereas the non-sentinel frame sequence on the other side of the black frame will be repeated far less often. However, a one-sided sentinel frame sequence may require a larger number of observations to detect the pattern and sentinel frame than the back-to-back pattern due to the statistical uncertainties about whether a black frame adjacent to two dissimilar sequences represents a program break including a sentinel frame sequence or an unmarked scene transition. A program break sentinel frame sequence may optionally be dependent upon program metadata, such as the program title, such as when the one-sided sentinel frame pattern is unique to the program. The metadata may be leveraged in detecting the pattern.

Another example of a sentinel pattern is a promotional segment sentinel frame sequence. A pattern for a promotional segment sentinel frame sequence may occur at the beginning or end of a promotional video inserted by a broadcaster to promote an upcoming event or broadcast. This sentinel may be a one sided sentinel frame sequence, and may be adjacent to a black frame. The promotional segment may also be identified by closed captions associated with the promotion. The captions help identify the promotional segment, but a transition event, such as black frames or a hard cut, is used to identify the boundaries of the promotional segment sentinel frame series.

Program start and program end sentinel frame sequences are another pattern that may be identified, and are similar to promotional segment sentinel frame series. Promotional segment sentinel frame series are repeated frequently in a pattern, sometime at multiple instances throughout a program. Program start and end sentinel frame sequences are repeated much less frequently, but program metadata information and electronic program guide information may be used to correlate likely program start and program end sentinel frame sequences with similar sequences from other episodes of the program. Not every program will have repeating program start and program end sentinel frame sequences but those that do may be detected using the pattern. The process of detecting these patterns will now be discussed in more detail.

Sentinel Frame Processor

Figure 3:
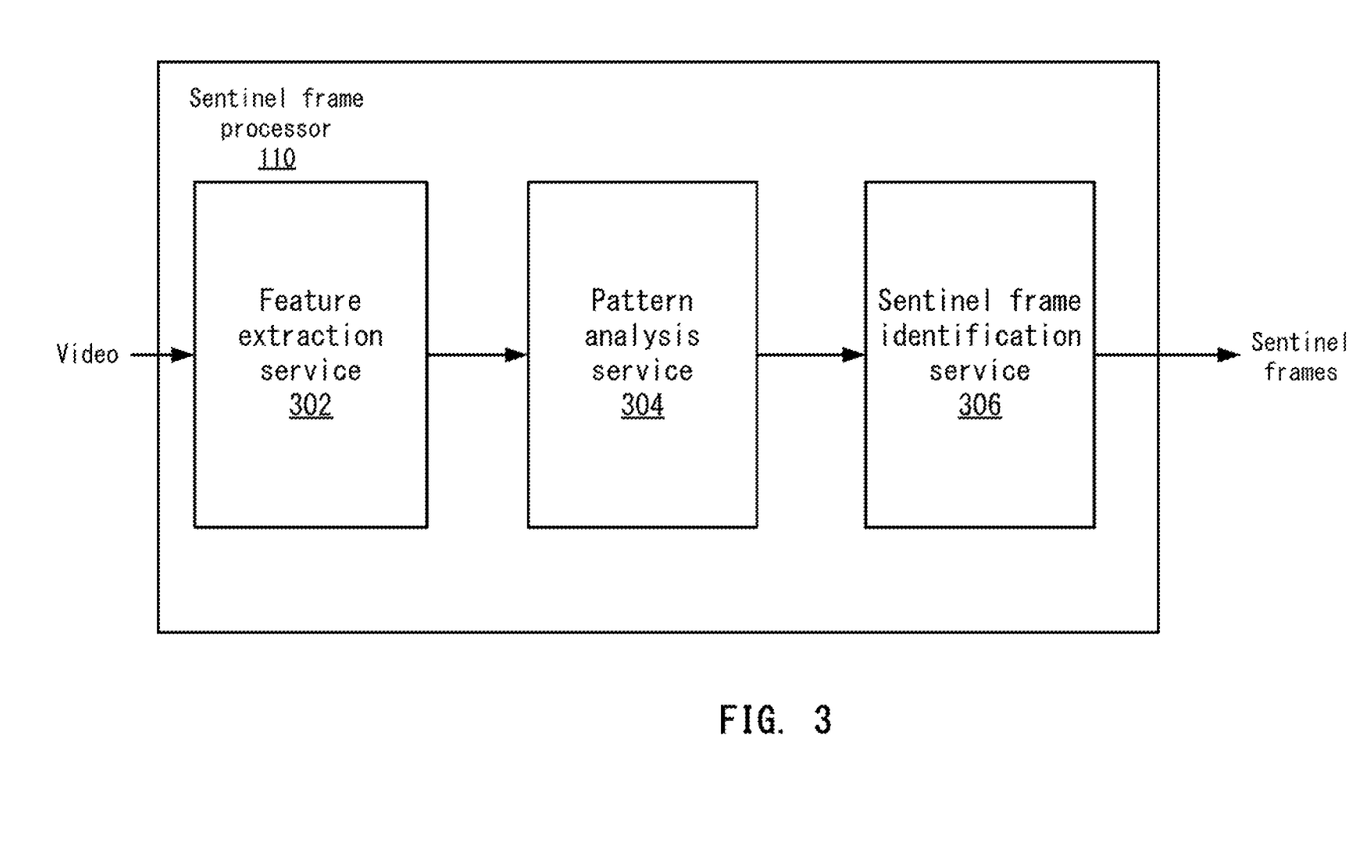
FIG. 3 depicts a more detailed example of a sentinel frame processor according to one embodiment.

FIG. 3 depicts a more detailed example of sentinel frame processor 110 according to one embodiment. A feature extraction service 302 receives the video and can extract features from the frames of the video. Although a single video is described, multiple videos may be processed. The features that could be extracted may be a color layout descriptor (CLD) or other visual features, such as edges that form an edge histogram. Although these visual features are described, other features may also be extracted. The color layout descriptor describes a distribution of color in a frame and the edge histogram summarizes edges found in the frame. The values for these features may be determined based on decoding a frame of the video. Accordingly, feature extraction service 302 may include logic for a decoder (not shown) or receive these features from a decoder. In another embodiment, the feature extraction service 302 uses optical character recognition to identify on-screen text marking program transitions. For example, the presence of on-screen text correlated with the program may mark the beginning or end of a program, or the beginning or end of a program break. In some embodiments, the on-screen text is known a priori, while in other embodiments the text is unpredictable while the underlying video background is predictable. In another embodiment, the feature extraction service may analyze the video and detect transitions where on-screen logos or ticker information appears and disappears. When combined with video transitions, such as fades or hard cuts, these transitions may be indicative of the start or end of a sentinel frame sequence and used as a pattern.

Pattern analysis service 304 may receive user input identifying patterns to look for. In other embodiments, pattern analysis service 304 may dynamically analyze a video to identify patterns that could be used. For example, a system administrator might be presented with a list of checkboxes identifying features known by the system and likely to occur near sentinel frame sequences. In one embodiment, the list might include black frames, a visual channel logo, and electronic guide information associated with one or more program. The system administrator may select one or more of the features to use as a trigger for sentinel frame identification. In another embodiment, patterns common to several days or months of programming may be automatically set to trigger sentinel frame identification when the number of sentinel frame detected over some number of hours or days goes below a threshold. In this embodiment, the relative absence of detected sentinels is indicative of changes to the underlying sentinel frame sequences.

In one embodiment, pattern analysis service 304 first uses the visual features to identify the location of black frames. Then, pattern analysis service 304 organizes sequential black frames into groups. That is, the black frame transition may last for a couple of frames in the video. For each group of black frames that have a number of frames that is under a threshold, such as groups of black frames of the length 1-3 frames, pattern analysis service 304 compares the visual features of non-black frames on either side of the black frame group to identify similar frame pairs. For example, this identifies two similar frames on both sides of the black frame. These frames may be right next to the black frame group or within a number of frames (e.g., within a threshold such as 5 frames).

Pattern analysis service 304 determines that frames are similar based on a threshold. For example, two frames may be similar if they have feature values that are similar within a threshold. When a similar frame-black frame-similar frame sequence is found, pattern analysis service 304 notes the location of the pattern. If pattern analysis service 304 does not find two frames that are similar on both sides of the black frame, pattern analysis service 304 does not consider this sequence a pattern.

After reviewing all the groups of black frames, pattern analysis service 304 may record the location of the patterns found. For example, the location of sentinel frame-black frame-sentinel frame patterns is recorded. Each pattern may be the sentinel sequence, black frame, sentinel sequence pattern.

A sentinel frame identification service 306 can then identify sentinel frames from the identified patterns. For example, sentinel frame identification service 306 may extract visual features for two or more sentinel frames in each pattern to create a candidate sentinel frame data set.

Sentinel frame identification service 306 then clusters sentinel frames in the candidate sentinel data set into one or more groups based on the visual features. For example, sentinel frames that may be similar may be clustered into a group. Then, sentinel frame identification service 306 returns a representative sentinel frame for each group. That is, the visual features for the frames in each group may be used to generate a sentinel frame.

Sentinel frame identification service 306 may generate the sentinel frame in different ways, such as by selecting a sentinel frame that is closest to an average the values for the visual features in the group. In other embodiments, an average of the visual features in the group may be used as the sentinel frame. In one example, the color layout descriptor (CLD) values may be generated for a sentinel frame based on the color layout descriptor values found in the group. Sentinel frame identification service 306 then outputs the locations of the sentinel frames in the video and the values for the sentinel frames. An example of the color layout descriptor for a sentinel frame may be [58, 19, 18, 16, 17, 15, 31, 17, 16, 32, 16, 16]. These numbers of the color layout descriptor capture the spatial distribution of color in an image. For example, the color layout descriptor values capture the spatial layout of the representative colors on a grid superimposed on a region or image. The representation is based on coefficients of the discreet cosine transform (DCT) and is a way of encoding RGB (Red, Green, Blue) information of an image, where the first 6 integer values represent the luma component of the CLD, the next 3 integer values represent the blue difference chroma component of the CLD and the final 3 integer values represent the red difference chroma component of the CLD. The above values represent the coefficients for the color layout descriptor for one exemplary sentinel frame.

Figure 4:
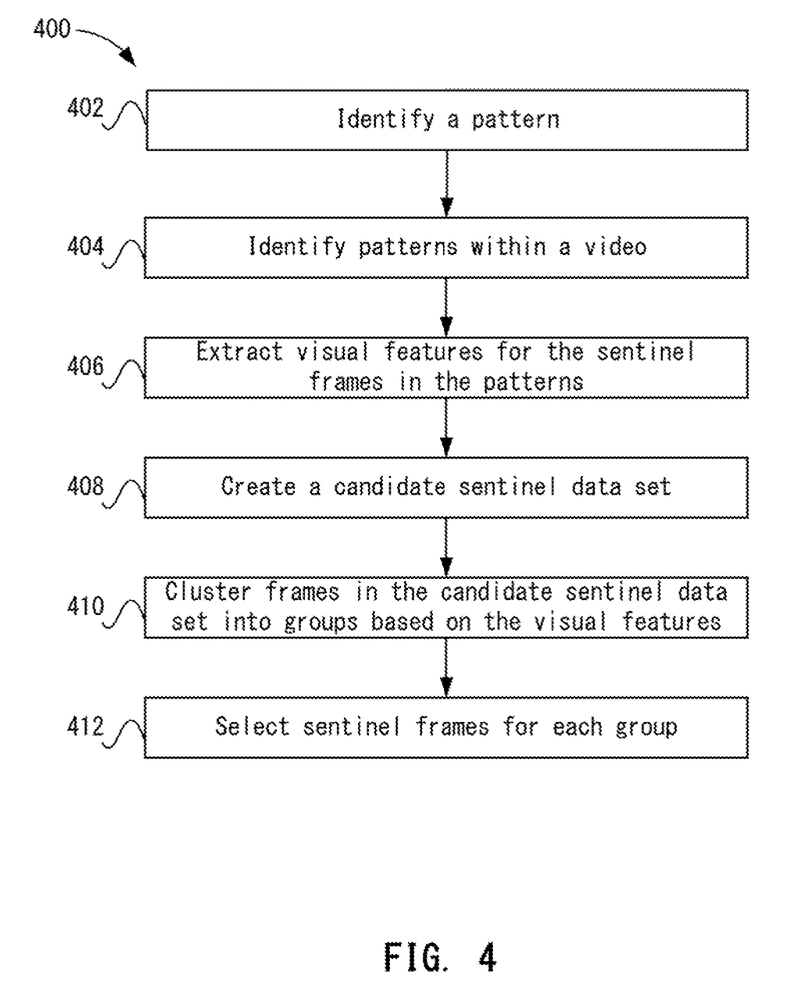
FIG. 4 depicts a simplified flowchart of a method for generating sentinel frames according to one embodiment.

FIG. 4 depicts a simplified flowchart 400 of a method for generating sentinel frames according to one embodiment. At 402, sentinel frame processor 110 identifies a pattern. The pattern may be identified based on receiving user input regarding the pattern, may be identified dynamically while processing the video or was identified from prior videos. At 404, sentinel frame processor 110 identifies patterns within a video. For example, after finding black frames, sentinel frame processor 110 determines if similar frames are located on each side of the black frames.

At 406, sentinel frame processor 110 extracts visual features for the sentinel frames in the patterns. For example, in the pattern described above, sentinel frame processor 110 identifies visual features for sentinel frames on both sides of a black frame. The visual features may include color layout descriptor values.

At 408, sentinel frame processor 110 creates a candidate sentinel data set. The candidate sentinel data set includes all of the candidate sentinel frames.

At 410, sentinel frame processor 110 clusters frames in the candidate sentinel data set into groups based on the visual features. This creates groups of possible sentinel frames that are similar within a threshold. At 412, sentinel frame processor 110 then selects sentinel frames for each group.

Clustering Processes

In steps 410 and 412, clustering was discussed. In one embodiment, sentinel frame processor 110 may use different clustering processes to generate sentinel frames. For example, sentinel frame processor 110 can use sequential and non-sequential processes. Although these clustering processes are used, it will be understood that other clustering processes may be used.

Figure 5:
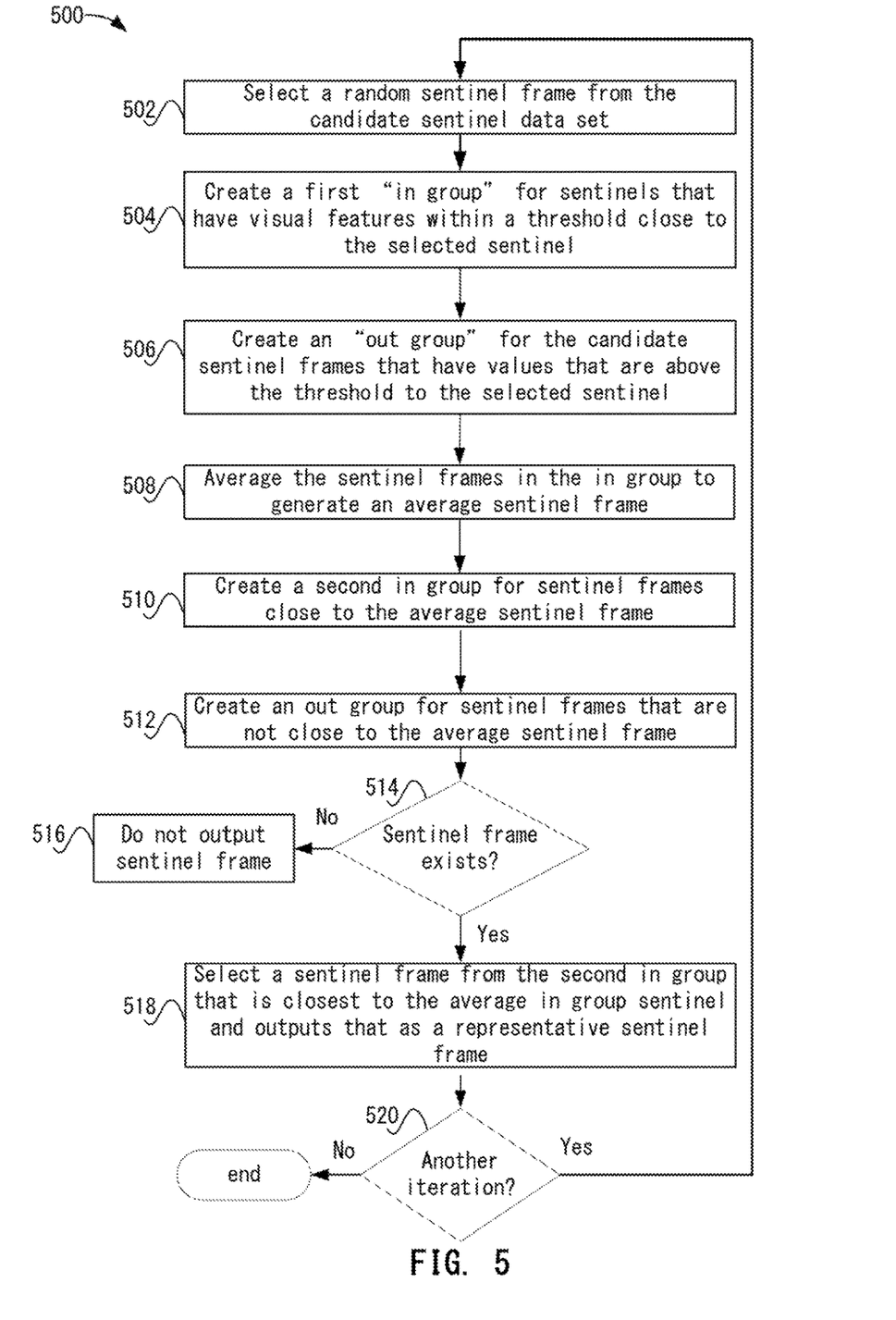
FIG. 5 depicts a simplified flowchart of an example sequential clustering process that may be used according to one embodiment.

FIG. 5 depicts a simplified flowchart 500 of an example sequential clustering process that may be used according to one embodiment. In this example, a sequential process is used as sentinel frames are generated sequentially, and not in parallel.

At 502, sentinel frame processor 110 selects a random sentinel frame from the candidate sentinel data set. For example, the first sentinel frame in the data set may be selected, but other sentinel frames may also be selected. For the remaining sentinel frames in the candidate data set, at 504, sentinel frame processor 110 creates a first "in group" for sentinels that have visual features within a threshold close to the selected sentinel. For example, a distance between the visual features, such as a CLD vector, can be defined as a maximum distance between elements in the selected sentinel frame CLD vector and the candidate frame CLD vectors.

At 506, for the remaining sentinels in the candidate data set, sentinel frame processor 110 creates an "out group" for the candidate sentinel frames that have values that are above the threshold to the selected sentinel. For example, candidate sentinel frames that have visual features with a large distance between elements in the candidate sentinel frame and the selected sentinel frame are placed in the out group. Accordingly, the out group is for sentinels that are not similar to the selected sentinel frame and the in group is for sentinel frames that are similar to the selected sentinel.

At 508, sentinel frame processor 110 averages the sentinel frames in the in group to generate an average sentinel frame. This may average the visual feature values for all of the in group sentinel frames.

At 510, sentinel frame processor 110 creates a second in group for sentinel frames close to the average sentinel frame. Then, at 512, sentinel frame processor 110 creates an out group for sentinel frames that are not close to the average sentinel frame.

At 514, sentinel frame processor 110 determines if a sentinel frame from the second in group exists. Sentinel frame processor 110 may output no sentinel frames if the number of sentinel frames in the second in group is less than a threshold. The candidate sentinel data set often includes a number of non-sentinel frames, as while many sentinel frames are located adjacent to transition frames not every transition frame is located adjacent to a sentinel frame. Cases where the number of sentinel frames in the second in group is below a threshold represent instances where the random sentinel frame selected in 502 is not a sentinel frame. In these cases, at 516, sentinel frame processor 110 does not output a representative sentinel frame. If a sentinel frame exists, at 518, sentinel frame processor 110 selects a sentinel frame from the second in group that is closest to the average in group sentinel and outputs that as a representative sentinel frame. This representative sentinel frame can then be used to detect sentinel frames in videos. In other embodiments, the average sentinel frame may be selected as the representative sentinel frame. However, because the average is being used, there may be slight differences between the average sentinel frame and sentinel frames found in the videos.

At 520, sentinel frame processor 110 determines if another iteration should be performed. If so, the above process is then repeated beginning at 502 with the sentinel frames in the out group being the sentinel frames in the candidate sentinel data set. If not, at the end, sentinel frame processor 110 has processed all the candidate sentinel frames and output representative sentinel frames that were found in the video.

Figure 6:
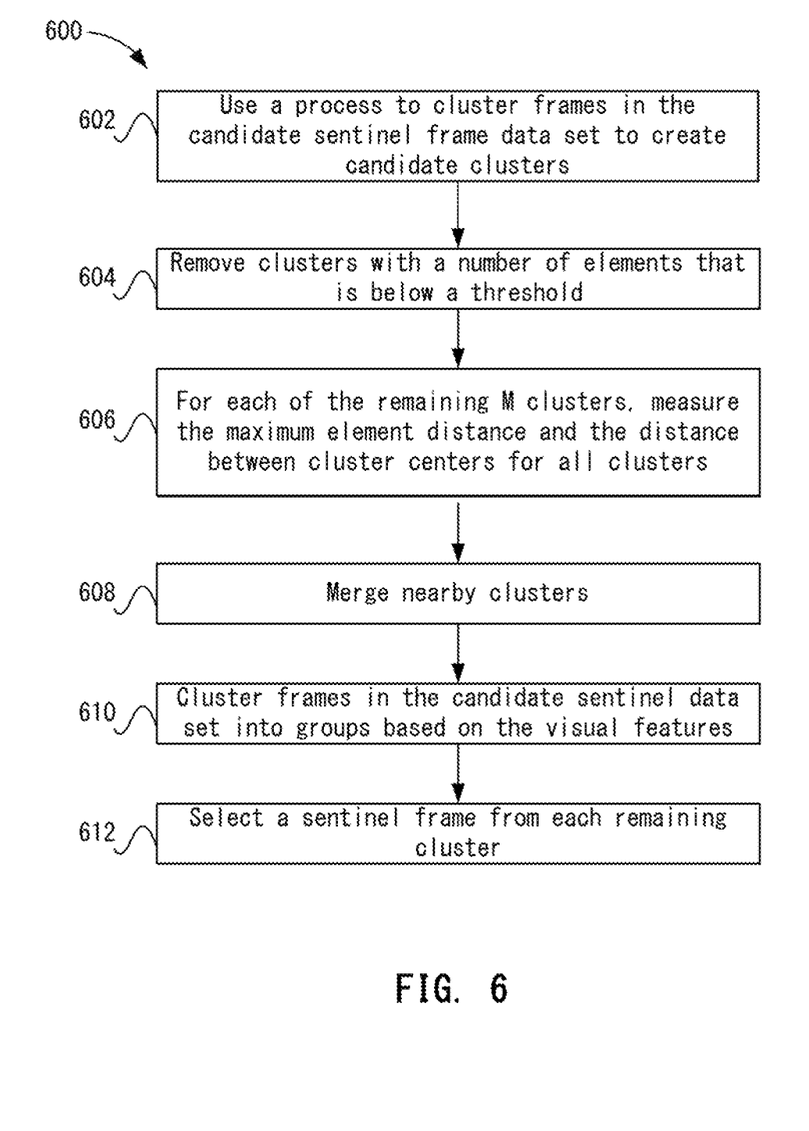
FIG. 6 depicts an example of a non-sequential clustering process according to one embodiment.

FIG. 6 depicts an example of a non-sequential clustering process according to one embodiment. Non-sequential may mean that the process is not performed by analyzing frames sequentially, but rather in parallel.

At 602, sentinel frame processor 110 uses a process, such as a K-means or similar algorithm, to cluster frames in the candidate sentinel frame data set to create candidate clusters. For example, this may initially start with N clusters, where N is the expected number of different sentinel frame sequences. In one embodiment, different sentinel frame sequences are expected for different programing categories, such as prime time programming, children's programming, sports programming and news programming. In this embodiment N=4. Another embodiment may initially start with N clusters, where N is the number of video programs included in the analysis. Since the number of sentinel frame sequences is typically smaller than the number of video programs included in the analysis, the number of candidate clusters are pared down as described below.

At 604, sentinel frame processor 110 removes clusters that include a number of elements that is below a threshold to produce a set of valid clusters. For example, the clusters removed may be clusters with a low number of elements, such as with no elements or with 1 element. A cluster with no elements may be a video program that did not include any unique candidate sentinel frames.

At 606, for each of the remaining M clusters (e.g., M<=N), sentinel frame processor 110 measures the maximum element distance and the distance between cluster centers for all clusters. The cluster center may be a value that is in the center of the values of the cluster. This measures how similar clusters are using the distance from the center of the clusters and the maximum distance between elements in the clusters. Although the center is discussed, other points in the clusters may be used.

At 608, sentinel frame processor 110 merges nearby clusters. For example, clusters having center distances that are less than a threshold Td may be merged. The threshold Td may be equal to (1+alpha)*(maximum in-cluster element distance for all clusters), where alpha is typically a positive real number less than one. This means that if the average distance between elements within valid clusters is larger than the distance between the centers of two candidate clusters, then the two candidate clusters may be merged.

At 610, sentinel frame processor 110 selects a sentinel frame from each remaining cluster. This is because all similar sentinel frames have been merged. In particular, when the average distance between elements in a cluster is significantly smaller than the distance between cluster centers and when the size of each cluster exceeds a threshold, then the number of clusters remaining is unlikely to exceed the number of unique sentinel frames. Thus, each of the remaining clusters is a valid cluster and the sentinel frame processor 110 may proceed to selecting a sentinel frame. For example, sentinel frame processor 110 selects one feature that is closest to the cluster center to represent the resulting sentinel frame. For example, the feature value for the center of the cluster may be selected as the resulting sentinel frame. Then, at 612, sentinel frame processor 110 outputs the sentinel frames for the clusters.

Sentinel Frame Update

Figure 7:
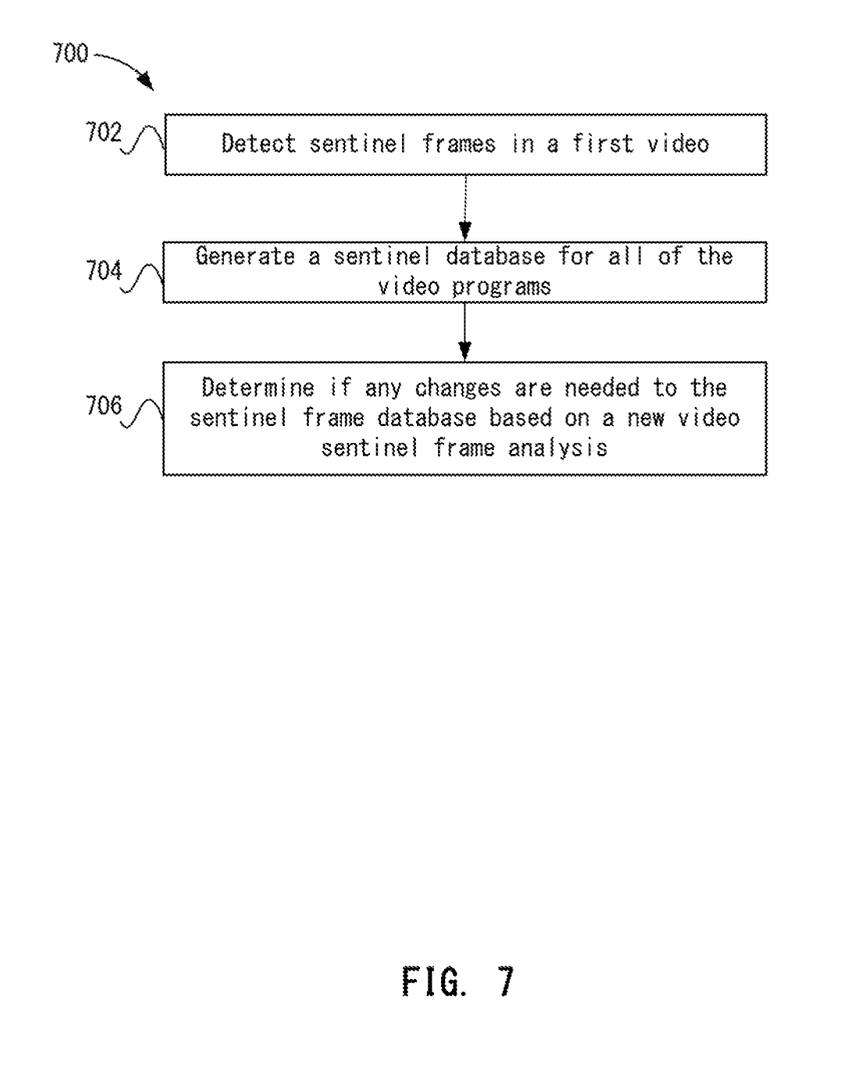
FIG. 7 depicts a flowchart of the overall process for using a sentinel frame data set according to one embodiment.

The sentinel frames that are detected may be used to detect sentinel frames in other video programs. Particular embodiments may maintain a database that can include an updated list of sentinel frames to use. FIG. 7 depicts a flowchart 700 of the overall process for using a sentinel frame data set according to one embodiment. At 702, sentinel frame processor 110 detects sentinel frames in a first video. Any of the processes described above may be used.

At 704, sentinel frame processor 110 generates a sentinel database for all of the video programs. This includes sentinel frames that are detected from all of the video programs.

In one embodiment, different video programs on a same channel may use different sentinel frames. In other embodiments, the same sentinel frames may be used in different video programs. That is, different shows may use different sentinel frames. However, within episodes of the same show, the same sentinel frames may be used. Also, different sentinel frames may be used on different days or times of the year or for different genres of video programming. For example, prime time programming may employ a first set of sentinel frames while children's programming may employ a second set of sentinel frames.

At 706, sentinel frame processor 110 determines if any changes are needed to the sentinel frame database based on a new video sentinel frame analysis. For example, sentinel frames may be added or deleted from the current sentinel frame database at any time. If the new sentinel frame sequences start appearing less often or are not detected at all, a sentinel frame update may be needed. Also, if a new sentinel frame sequence starts appearing, then a sentinel frame update may be needed. Thus, using particular embodiments, if a representative sentinel frame is close to a sentinel frame already in the current sentinel frame database, then an update may not be necessary. However, if a representative sentinel frame is unique and not found in the sentinel frame database, then an update of the current sentinel frame database would add the new sentinel frame and could improve ad detection and replacement performance.

Accordingly, particular embodiments are able to identify sentinel frames based on pattern analysis. The blind detection of sentinel frames allows the system to detect sentinel frames even in the event that different programs use different sentinel frames or in the presence of seasonal changes to the sentinel frames. In this case, even though the sentinel frames change, the overall pattern may be the same and may still be detectable. For example, when a sentinel frame is manually uploaded, particular embodiments allow an operator to validate the presence of the sentinel sequences containing the uploaded sentinel frame using a high-quality metric. That is, sentinel frame processor 110 can detect sentinel frames in a video that should match the uploaded sentinel frame.

Example Computer System

Figure 8:
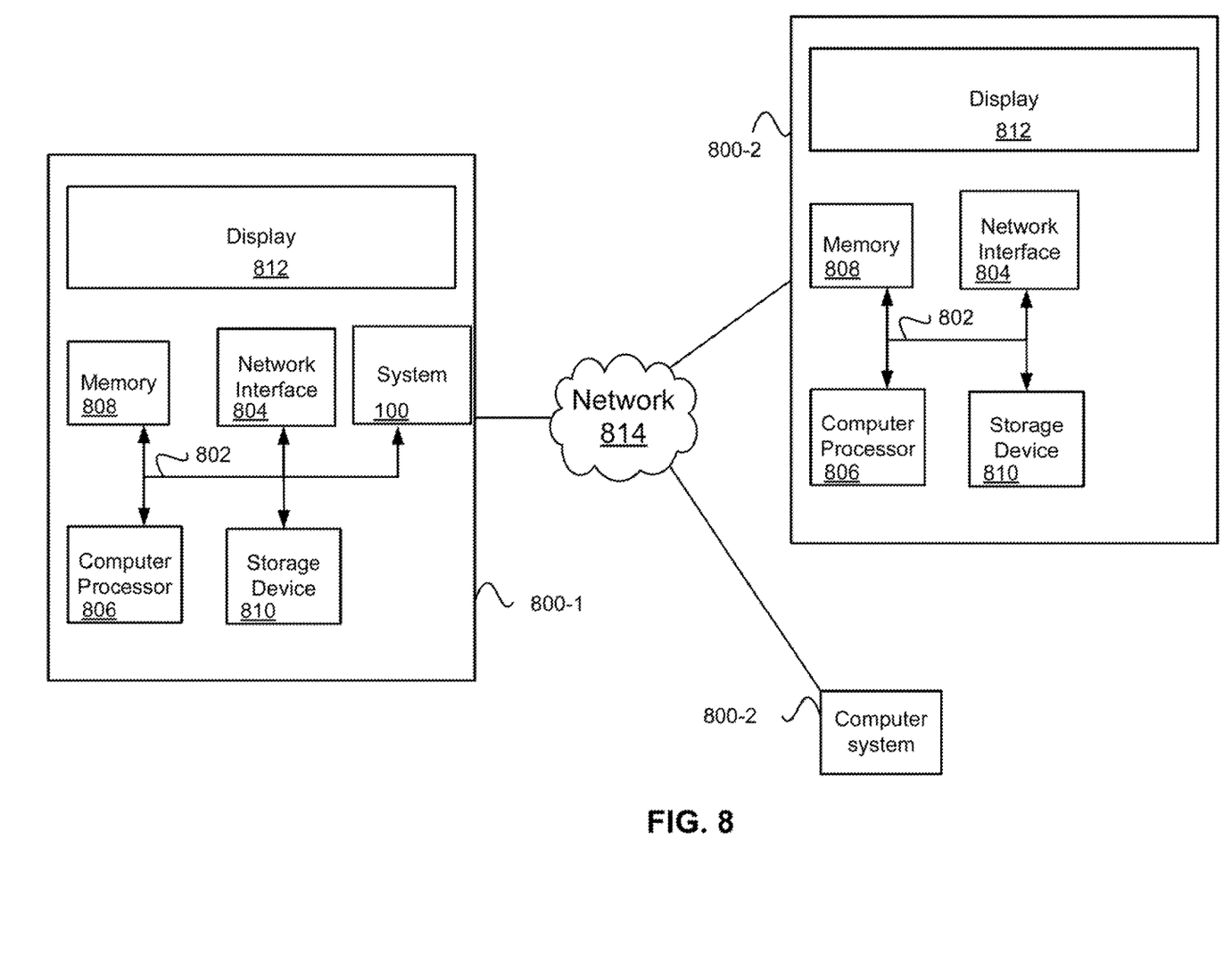
FIG. 8 illustrates an example of a special purpose computer system configured with the sentinel frame processor according to one embodiment.

FIG. 8 illustrates an example of a special purpose computer system 800 configured with sentinel frame processor 110 according to one embodiment. In one embodiment, computer system 800-1 describes system 100 including video processor 102. Also, computer system 800-2 describes clients 108. Only one instance of computer system 800 will be described for discussion purposes, but it will be recognized that computer system 800 may be implemented for other entities described above.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   extracting, by a computing device, frame features for a plurality of frames from a video;
   identifying, by the computing device, a pattern from a sequence of frames of the plurality of frames, the pattern being identified based on a pattern analysis using the frame features for frames in the sequence of frames;
   clustering, by the computing device, a set of candidate frames into one or more groups based on the frame features for the set of candidate frames;
   selecting, by the computing device, sentinel features for each of the one or more groups from the frame features for frames in the sequence of frames based on the pattern;
   generating a sentinel frame for each of the one or more groups, using the sentinel features for the frames in each of the one or more groups;

outputting, by the computing device, a set of sentinel frames for each of the one or more groups using the sentinel features, the set of sentinel frames identifying a transition in the video from a first content type to a second content type, wherein the sentinel frame includes the sentinel features;

storing, by the computing device, the set of sentinel frames in a sentinel database;

analyzing, by the computing device, a new video, the analyzing includes repeating the extracting, identifying, clustering, and generating steps;

comparing, by the computing device, the generated sentinel frames for the new video to the sentinel frames stored in the sentinel database;

determining, by the computing device, the generated sentinel frames for the new video includes at least one different sentinel frame from the sentinel frames stored in the sentinel database; and updating, by the computing device, the sentinel database based on the at least one different sentinel frame.

2. The method of claim 1, wherein identifying the pattern comprises:

selecting a transitional frame in the sequence of frames, wherein the transitional frame is different from the sentinel frame; and using at least one frame in the sequence of frames that is before or after the transitional frame to select the sentinel features.

3. The method of claim 2, wherein selecting the sentinel features comprises using a frame in the sequence of frames on both sides of the transitional frame in the sequence of frames to select the sentinel features.

4. The method of claim 2, wherein identifying the pattern comprises:

comparing a first frame on a first side of the transitional frame to a second frame on a second side of the transitional frame to determine if the first frame and the second frame are similar within a threshold; and when the first frame and the second frame are similar within the threshold, identifying the sequence of frames as including the pattern.

5. The method of claim 2, further comprising:

grouping sequential transitional frames in the sequence of frames into a group, wherein the at least one frame in the sequence of frames is near the group within a threshold.

6. The method of claim 2, wherein the transitional frame is a solid color frame.

7. The method of claim 1, wherein the pattern comprises a first sequence of frames and a transitional frame.

8. The method of claim 7, further comprising:

locating a second sequence of frames in addition to the first sequence of frames and the transitional frame, wherein:

a first frame in the first sequence of frames matches a second frame in the second sequence of frames within a threshold, and the sentinel features are selected from the first frame or the second frame.

9. The method of claim 1, wherein the sentinel features comprise features determined from decoding the frames of the video.

10. The method of claim 1, further comprising:

receiving an input identifying the pattern.

11. The method of claim 1, wherein the set of sentinel frames are not previously known before selecting the sentinel features.

12. An apparatus comprising:

one or more computer processors; and a non-transitory computer-readable storage medium comprising instructions that, when executed, control the one or more computer processors to be configured for:

extracting frame features for a plurality of frames from a video;

identifying a pattern from a sequence of frames of the plurality of frames, the pattern being identified based on a pattern analysis using the frame features for frames in the sequence of frames;

clustering a set of candidate frames into one or more groups based on the frame features for the set of candidate frames;

selecting sentinel features for each of the one or more groups from the frame features for frames in the sequence of frames based on the pattern;

generating a sentinel frame for each of the one or more groups, using the sentinel features for the frames in each of the one or more groups;

outputting a set of sentinel frames for each of the one or more groups using the sentinel features, the set of sentinel frames identifying a transition in the video from a first content type to a second content type, wherein the sentinel frame includes the sentinel features;

storing the set of sentinel frames in a sentinel database;

analyzing, by the computing device, a new video, the analyzing includes repeating the extracting, identifying, clustering, and generating steps;

comparing, by the computing device, the generated sentinel frames for the new video to the sentinel frames stored in the sentinel database;

determining, by the computing device, the generated sentinel frames for the new video includes at least one different sentinel frame from the sentinel frames stored in the sentinel database; and updating, by the computing device, the sentinel database based on the at least one different sentinel frame.

13. The method of claim 1, wherein the frame features extracted include one or more of: a color layout descriptor, an edge histogram, on-screen textual markings, on-screen logos, and ticker information.

14. The method of claim 1, wherein the first content type is program content and the second content type is advertising content.

* * * * *